United States Patent
Palvolgyi et al.

(10) Patent No.: US 6,367,520 B1
(45) Date of Patent: Apr. 9, 2002

(54) FUEL FILLER INLET FOR MOTOR VEHICLES

(75) Inventors: Sandor Palvolgyi, Gleisdorf; Johann Schuster, Anger; Peter Lenhard, Lang, all of (AT)

(73) Assignee: Tesma Motoren-Une Getriebetechnik Ges.m.b.H., Preding (AT)

(*) Notice: Subject to any disclaimer, the term of this patent is extended or adjusted under 35 U.S.C. 154(b) by 0 days.

(21) Appl. No.: 09/507,380

(22) Filed: Feb. 18, 2000

(30) Foreign Application Priority Data

Feb. 19, 1999 (AT) .............................. 108/99 U

(51) Int. Cl.⁷ ................................. B05B 3/04
(52) U.S. Cl. ...................... 141/289; 220/80.2
(58) Field of Search ..................... 141/285, 286, 141/312; 220/80.2

(56) References Cited

U.S. PATENT DOCUMENTS

| | | | |
|---|---|---|---|
| 3,979,010 A | * 9/1976 | Fiedler et al. ............. | 220/86.2 |
| 4,157,104 A | * 6/1979 | Lofquist, Jr. ............... | 141/292 |
| 4,300,699 A | 11/1981 | Anhegger | |
| 4,915,249 A | 4/1990 | Anhegger et al. | |
| 4,995,433 A | * 2/1991 | Beicht et al. ............... | 141/312 |
| 5,261,700 A | * 11/1993 | Martenas et al. ........... | 280/834 |
| 5,538,055 A | * 7/1996 | Kunz et al. ................. | 141/312 |
| 5,669,361 A | 9/1997 | Weissinger et al. | |
| 5,732,840 A | 3/1998 | Foltz | |
| 6,079,581 A | * 6/2000 | Hashimoto et al. ........ | 220/86.2 |

FOREIGN PATENT DOCUMENTS

| | | |
|---|---|---|
| DE | 3734782 | 3/1989 |
| DE | 19533306 | 12/1996 |
| EP | 0893294 A2 | 1/1999 |

* cited by examiner

Primary Examiner—Gregory L. Huson
Assistant Examiner—Peter DeVore
(74) Attorney, Agent, or Firm—Bachman & LaPointe, P.C.

(57) ABSTRACT

A fuel-filler inlet for motor vehicles comprises a closure neck, an insert associated with the closure neck, a filling chamber downstream of the insert, and a filling tube downstream of the filling chamber which leads to a fuel tank. In order to achieve good guidance of the fuel nozzle, reliable response of the expansion port and ventilation during the fuel-dispensing operation, a collar is provided between the filling chamber and filling tube, the internal diameter of which is somewhat larger than that of the opening tube of a fuel nozzle. The collar provides through-passage openings which, with the fuel nozzle inserted, produce a flow connection between the filling tube and filling chamber.

7 Claims, 2 Drawing Sheets

FUEL FILLER INLET FOR MOTOR VEHICLES

BACKGROUND OF THE INVENTION

The present invention relates to a fuel-filler inlet for motor vehicles which comprises a closure neck, an insert associated with the closure neck, a filling chamber downstream of the insert, and a filling tube downstream of the filling chambers which leads to a fuel tank.

Nowadays, fuel-filler inlets have to meet particularly high requirements: they are intended to provide good guidance of the fuel nozzle, in order that, during the fuel-dispensing operation, the fuel flow passes smoothly into the filling tube; this means that the latter may be of slender design and does not require a large amount of space. They are intended to ensure that the supply pump in the fuel pump is switched off when the tank is full, for which purpose the opening tube of the fuel nozzle has a so-called expansion port. Poor guidance of the fuel nozzle in the inlet may result in the supply pump being switched off prematurely, which may also be annoying. And, with the presence of ventilation of the fuel vapors, they are not intended to obstruct the same. Of course, they are also intended to be easy to produce and install.

An insert is therefore usually provided in the filler inlet in practice, the inner diameter of the said insert being only slightly larger than the opening tube of the fuel nozzle. However, this simple guidance is not sufficient for positioning the fuel nozzle precisely, and the insert is subjected to pronounced loading on account of the weight of the fuel nozzle. It often consists merely of plastic and ruptures easily.

Such an insert is known, for example, from DE 195 33 306 C1. If the expansion port of the opening tube is provided laterally on the latter and is covered by the insert, switching off the supply pump is not ensured. Fuel may be spilt. With the presence of ventilation, this may even result in liquid fuel passing into the extraction system, which damages the activated-carbon filter.

Furthermore, DE 37 34 782 A1 discloses a filler inlet which has ventilation and a spring-loaded flap valve which does not precisely guide the direction of the fuel nozzle, although it is arranged at a lower level in the filler inlet. This low-level arrangement results in the risk of a lateral expansion port not being reached by the pressure surge which is designed to switch off the pump. Finally, with the fuel nozzle inserted, there is insufficient flow cross section, if any at all, through which air and fuel vapors could escape. Although through-passages are provided in the insert, they are used merely for the flow of air to the closure cap.

It is an object of the invention to configure a filler inlet such that it fulfills all the requirements specified above, namely, good guidance of the fuel nozzle, reliable response of the expansion port and, if appropriate, ventilation during the fuel-dispensing operation.

SUMMARY OF THE INVENTION

The foregoing object is achieved according to the invention by providing a collar between the filling chamber and filling tube, the inner-border diameter of which is somewhat larger than that of the opening tube of a fuel nozzle, and forms through-passage openings which, even with the fuel nozzle inserted, produce a flow connection between the filling tube and filling chamber.

The collar is thus provided in addition to the insert, and some distance therefrom, it not being necessary for the insert to project far into the filling chamber. This means that the opening tube of the fuel nozzle is provided with a sufficient guidance length and is guided precisely such that the stream of fuel can flow straight into the filling tube. By way of through-passage openings, pressure surges act reliably on the expansion port of the fuel nozzle and fuel vapors can pass to the ventilation means virtually without obstruction. In addition, and by virtue of its volume, the filling chamber acts as a stabilizing chamber into which, despite the full pressure equalization, it is not possible for any fuel to splash.

The collar is preferably conical. This means that the opening tube of the fuel nozzle is guided into the correct position without the pushing-in action being obstructed. Inexpensive and simple production is achieved if the collar, furthermore, is formed integrally with the wall of the filling chamber. The through-passage openings on the collar may be through-passage holes distributed over the circumference; however, they may also be formed by clearances on the inner border diameter of the collar.

In an embodiment of the invention, the insert has an inwardly directed conical wall, of which the end diameter is somewhat larger than the opening tube of a fuel nozzle, and a flap valve is provided at said inner end. Since the insert need not be positioned so far inward, the filling chamber may give generous dimensions; thus, by way of its volume, it also constitutes a stabilizing chamber and there is sufficient space for the flap valve. The filling chamber may thus also be connected directly to the ventilation means if one is provided.

BRIEF DESCRIPTION OF THE DRAWINGS

The invention is described and explained hereinbelow with reference to drawings of a non-restrictive exemplary embodiment, in which.

DETAILED DESCRIPTION OF THE DRAWINGS

Figure 1:
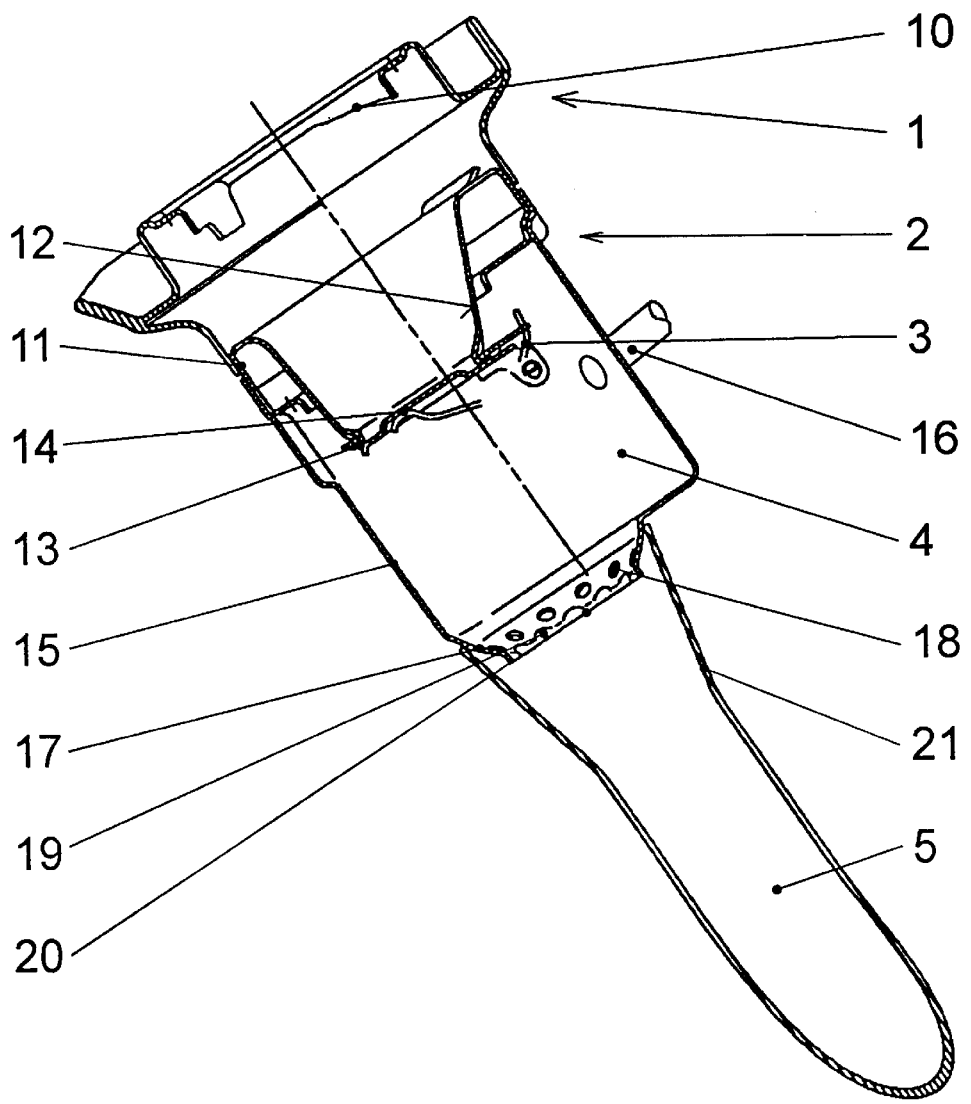
FIG. 1 shows a filler inlet in the rest state.

According to FIG. 1, the filler inlet comprises a closure neck 1, an adjoining insert 2 with a valve 3, a filling chamber 4 and an adjoining filling tube 5, which leads to a fuel tank (not illustrated).

The closure neck 1 is, for example, a reverse-drawn sheet-metal part with a cap guide 10 for a closure cap (not illustrated). The insert 2, in this case is likewise a sheet-metal part, comprises a cylindrical part 11, which is welded to the closure neck, and an inwardly directed conical wall 12, on the inner end 13 of which the valve 3 is arranged. The latter comprises a valve flap 14, in this case closed, which, when a fuel nozzle is introduced, opens inward counter to the force of a spring. The filling chamber 4 is formed by a wall 15. If the latter consists of sheet metal, which is not necessary, it too is welded to the cylindrical part 11 of the insert 2. If a ventilation means is provided, the ventilation duct 16 opens out in the filling chamber 4.

Provided at the bottom end of the filling chamber 4 is a conical collar 17, in this case integral with the wall 15 of the filling chamber, that is to say produced in the same operation as the latter. However, the collar 17 could also be a separate part fastened in some way. The collar 17 has, distributed uniformly over its circumference, through-passage holes 18 and clearances 19, formed for example by an undulating contour of the inner border 20. Through-passage holes 18 and/or clearances 19 form the through-passage openings for the vapors which escape from the fuel tank during the fuel-dispensing operation and for the pressure surge which results in the supply pump in the fuel pump (neither is illustrated) being switched off. The filling tube 5, which forms a slightly conical transition 21, is fastened at the bottom of the wall 15 or of the collar 17.

Figure 2:
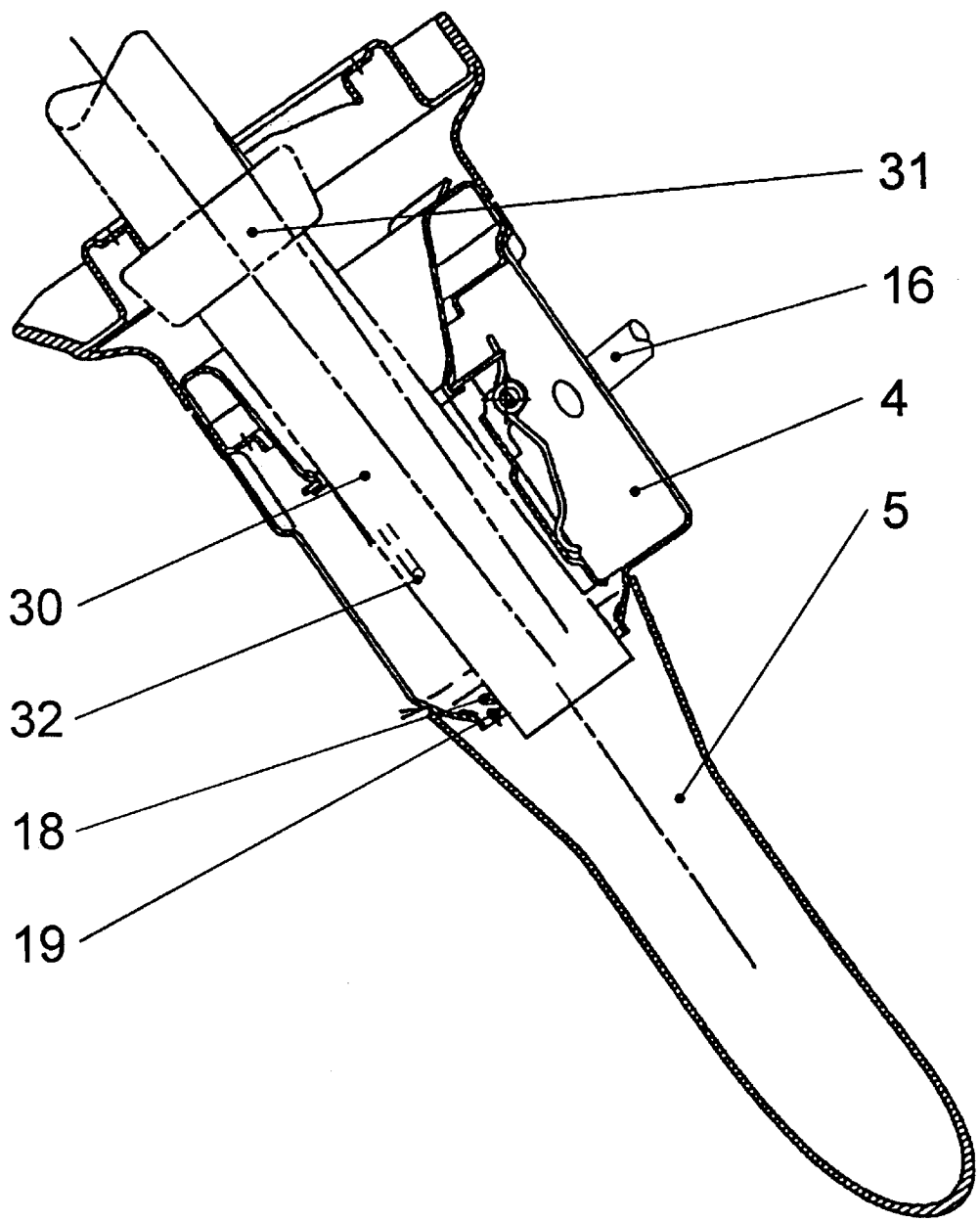
FIG. 2 shows the same filler inlet with the fuel nozzle inserted.

In FIG. 2, the fuel nozzle, illustrated merely by its opening tube 30, has been inserted into the filler inlet for the fuel-dispensing operation. In this case, it may be suspended by way of a tooth or neck 31 in the cap guide 10 of the closure neck 1. The opening tube 30 projects through the inner end 13 of the insert 2, it being supported thereon, and on into the collar 17, in which it is likewise supported, at some distance (which gives the guidance length) from the insert 2. The diameter of the inner end 13 of the insert 2 is somewhat larger than that of the opening tube 30. The diameter of the inner border 20 is likewise somewhat larger than that of the opening tube 30. This means that, with sufficient specific guidance, the opening tube still has sufficient clearance in order to be suspended in the closure neck by way of its neck 31. During the fuel-dispensing operation, vapors expelled from the fuel tank flow through the through-passage openings 18, 19 into the filling chamber 4 and, from there, through the duct 16 to the ventilation means. Splashes which may be produced at the transition from the opening tube 30 into the filling tube 5 are kept away from the filling chamber 4 by the collar 17. By way of its volume, the filling chamber 4 forms something of a stabilizing chamber.

Once, during the fuel-dispensing operation, the maximum filling level of the fuel tank has been reached, a pressure wave moves upward through the filling tube. This can pass without obstruction through the through-passage openings 18, 19 of the collar into the filling chamber 4 and can thus act on the expansion port 32 of the opening tube, with the result that the supply pump is switched off reliably, and only when the tank is actually full.

What is claimed is:

1. A fuel-filler inlet for motor vehicles, which comprises: a closure neck; an insert associated with the closure neck, said insert having a valve; a filling chamber downstream of the insert; and a filling tube downstream of the filling chamber which leads to a fuel tank; a collar provided between the filling chamber and filling tube, said collar having an internal diameter which is larger than that of an opening tube of a fuel nozzle for filling the fuel tank which defines a first passage means between the filling tube and the filling chamber; said collar includes a second passage means for producing a flow connection between the filling tube and filling chamber at least when the fuel nozzle is inserted into the first passage means.

2. The fuel-filler inlet as claimed in claim 1, wherein the collar is conical.

3. The fuel-filler inlet as claimed in claim 1, wherein the collar is formed integrally with a wall of the filling chamber.

4. The fuel-filler inlet as claimed in claim 1, wherein the second passage means comprises through-passage openings distributed over the collar.

5. The fuel-filler inlet as claimed in claim 1, wherein the collar has an inner border defining the first passage means which is provided with clearances which form the second passage means.

6. The fuel-filler inlet as claimed in claim 1, wherein the insert has an inwardly directed conical wall, having a diameter at the inner end thereof which is larger than that of the opening tube of the fuel nozzle, and a flap valve is provided at said inner end.

7. The fuel-filler inlet as claimed in claim 1, wherein the filling chamber is connected to a ventilation system.

\* \* \* \* \*